(12) United States Patent
Pugsley

(10) Patent No.: US 8,411,398 B2
(45) Date of Patent: Apr. 2, 2013

(54) ELECTROSTATIC DISCHARGE PROTECTION

(75) Inventor: William Pugsley, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 642 days.

(21) Appl. No.: 12/609,916

(22) Filed: Oct. 30, 2009

(65) Prior Publication Data

US 2010/0110596 A1   May 6, 2010

(30) Foreign Application Priority Data

Oct. 31, 2008   (GB) .................................. 0820042.0

(51) Int. Cl.
*H02H 9/00* (2006.01)

(52) U.S. Cl. ........................................................ 361/56

(58) Field of Classification Search ..................... 361/56
See application file for complete search history.

(56) References Cited

U.S. PATENT DOCUMENTS

| | | | | |
|---|---|---|---|---|
| 5,717,558 | A * | 2/1998 | Lynn et al. | 361/56 |
| 6,650,103 | B2 * | 11/2003 | Righter | 324/117 H |
| 2005/0286188 | A1 * | 12/2005 | Camp et al. | 361/56 |
| 2007/0188952 | A1 * | 8/2007 | Ker et al. | 361/56 |

* cited by examiner

*Primary Examiner* — Jared Fureman
*Assistant Examiner* — Scott Bauer
(74) *Attorney, Agent, or Firm* — Pillsbury Winthrop Shaw Pittman LLP

(57) ABSTRACT

An integrated circuit (100) comprising a driver element (108) electrically connected to a pin of a package housing the integrated circuit (100), the driver element (108) being associated with a detection element (128) such that on detection of an electrostatic discharge event occurring at the pin by the detection element (128) a system associated with the integrated circuit (100) can be activated.

39 Claims, 4 Drawing Sheets

ELECTROSTATIC DISCHARGE PROTECTION

REFERENCE TO RELATED APPLICATION

The present application claims the benefit of U.K. Patent Application No. 0820042.0, filed Oct. 31, 2008, whose disclosure is hereby incorporated by reference in its entirety into the present disclosure.

FIELD OF THE INVENTION

The present invention relates to an integrated circuit having a system for electrostatic discharge protection, and to a device incorporating such an integrated circuit.

DESCRIPTION OF RELATED ART

It is well known that integrated circuits are susceptible to damage from electrostatic discharge (ESD), and standards relating to the performance of integrated circuits and devices incorporating them under ESD conditions have been developed. For example, the IEC61000-4-2 standard is a common standard for testing the immunity of electrical and electronic equipment to electrostatic discharges.

System level ESD tolerance tests require a device to be tolerant to ESD events under all operating conditions, and there may also be a requirement for the device to be capable of continuous operation during an ESD event or to resume operation after an ESD event without intervention by a user of the device.

ESD damage to integrated circuits and disruption to the operation of integrated circuits within devices can be mitigated by components connected to the integrated circuit or to a package housing the integrated circuit, but in some instances input and output circuits of an integrated circuit cannot be protected in this way, for example the input and output connections of a headphone amplifier integrated circuit. Specialist external ESD protection components must be used to protect these input and output circuits, which can add considerably to the cost and physical size of the integrated circuit and a device in which it is incorporated.

FIG. 1 is a schematic representation of an integrated circuit incorporating a known ESD protection system for protecting the integrated circuit from ESD events. The integrated circuit is shown generally at 10, and comprises a core 12 which handles the core functionality of the integrated circuit 10. For example, if the integrated circuit 10 is a headphone amplifier, the core 12 will include appropriate amplification components. A power supply pad 14 of the integrated circuit 10 is electrically connected to a pin of a package housing the integrated circuit 10, permitting the integrated circuit 10 to be powered by an appropriate power supply. ESD tolerant output drivers 16, 18, which in this example are n-channel and p-channel extended drain MOSFETs respectively, are provided, with these output drivers 16, 18 being electrically connected to an input/output pad 20 which is electrically connected to a pin of the package housing the integrated circuit 10, which pin provides the output of the integrated circuit 10. In this context the phrase "ESD tolerant" means that the output drivers 16, 18 will not be damaged if they are subjected to the voltages and currents associated with an ESD event.

The integrated circuit 10 further comprises a power supply ESD protection system, which is shown generally at 22. The power supply ESD protection system 22 comprises a network of a resistor 24 and a capacitor 26, which network provides a time delayed signal to an input of an inverter 28. An output of the inverter 28 is connected to a gate terminal of a large MOSFET 30, whose drain and source terminals are respectively connected to positive and ground rails 32, 34 of the integrated circuit 10.

In the event of a positive voltage ESD event occurring between the pin connected to the input/output pad 20 to which the output drivers 16, 18 are connected and the ground rail 34 the n-channel MOSFET output driver 18 may conduct the current associated with the event to ground, but a high voltage may occur at the pad 20 due to the extended drain resistance of the n-channel MOSFET output driver 18, or parasitic resistance in the circuit. This high voltage may be conducted to the positive supply rail 32 of the integrated circuit 10 through a parasitic diode 36 formed in the p-channel MOSFET output driver 16. If the integrated circuit 10 is not powered, this "over voltage" on the positive supply rail 32 can be safely conducted to the ground rail 34 by the power supply ESD protection system 22. The power supply ESD protection system (also known as an "ESD clamp") works by detecting the rapidly rising voltages that occur during an ESD event. When the voltage on the positive power supply rail increases rapidly the input of the inverter 28 is held at ground by the capacitor 26, causing the output of the inverter 28 to be high, thus switching on the MOSFET 30, which short-circuits the positive and ground rails 32, 34 of the integrated circuit 10, allowing the current associated with the ESD event to be conducted safely to ground instead of into the core 12 of the integrated circuit 10.

During the ESD event, the capacitor 26 charges up through the resistor 24, and after a few microseconds the voltage at the input of the inverter 28 is sufficiently high to cause the output of the inverter 28 to go low, at which point the MOSFET 30 switches off, causing an open circuit between the positive and ground rails 32, 34 of the integrated circuit 10. In this way, the integrated circuit 10 is able to function correctly when connected to a suitable power supply. This means that once the integrated circuit 10 is powered the ESD protection system 22 is disabled.

The values of the capacitor 26 and the resistor 24 are selected so as to allow sufficient time for all of the current associated with the ESD event to be conducted to ground safely before the MOSFET 30 switches off, thus ensuring that the ESD event can be safely handled without compromising the future operation of the integrated circuit 10.

A disadvantage of the ESD protection system 22 shown in FIG. 1 is that it can only protect the core 12 of the integrated circuit 10 from over voltage on the positive power supply rail 32 when the integrated circuit 10 is not connected to a power supply, since soon after the integrated circuit 10 is connected to a power supply, the input to the inverter 28 goes high, causing its output to go low, thus holding the MOSFET 30 in a switched off condition. In fact, in the case where an ESD event occurs when the integrated circuit 10 is powered, the MOSFET 30 will eventually switch on, although at this point the voltage of the positive power supply rail will be so high that the core 12 of the integrated circuit 10 will be damaged.

SUMMARY OF THE INVENTION

According to a first aspect of the invention, there is provided an integrated circuit comprising a driver element electrically connected to a pin of a package housing the integrated circuit, the driver element being associated with a detection element such that on detection of an electrostatic discharge event occurring at the pin by the detection element a system associated with the integrated circuit can be activated.

In the integrated circuit of the first aspect of the invention, a system associated with the integrated circuit, such as an electrostatic discharge protection system, can be activated in any operational state of the integrated circuit. This permits, for example, active protection against, monitoring of and correction of adverse effects caused by electrostatic discharge events even when the integrated circuit is powered.

By providing the detection element as part of the integrated circuit, there is no need for an external detection or protection system on a printed circuit board incorporating the integrated circuit, thus giving rise to cost savings, as fewer external components are required, as well as improved reliability and a reduction in the physical size of a product or device, such as a Bluetooth® headset incorporating the integrated circuit.

A voltage of a substrate on which the driver element is mounted may increase when an electrostatic discharge event occurs at the pin.

The detection element may be located in close proximity to the driver element such that when an electrostatic discharge event occurs at the pin the detection element is activated by the increased voltage of the substrate.

The driver element may be tolerant of electrostatic discharge events.

The system associated with the integrated circuit may comprise an electrostatic discharge protection system.

The electrostatic discharge protection system may comprise a transistor which is configured to connect a power supply rail of the integrated circuit to ground for a predetermined time period in the event of an electrostatic discharge event occurring at the pin.

The electrostatic discharge protection system may further comprise a capacitor for setting the predetermined period of time.

The detection element may be configured to discharge the capacitor in the event of an electrostatic discharge event occurring at the pin.

The electrostatic discharge protection system may comprise a transistor which is configured to disconnect part of the integrated circuit from a power supply rail of the integrated circuit in the event of an electrostatic discharge event occurring at the pin.

The integrated circuit may further comprise a resistive element for limiting current to the electrostatic discharge protection system.

Alternatively, the system associated with the integrated circuit may comprise a correction system for a circuit.

For example, the correction system may comprise a processor which is part of a digital circuit, the processor being configured to take corrective action when an electrostatic discharge event is detected by the detection element of the integrated circuit.

The correction system may comprise a software program running on the processor, the software program being configured to cause the processor to take corrective action when an electrostatic discharge event is detected by the detection element of the integrated circuit.

Alternatively, the correction system may comprise a digital circuit which is configured to take corrective action when an electrostatic discharge event is detected by the detection element of the integrated circuit.

The correction system may comprise a reset mechanism for resetting the circuit to a known correct state of operation.

The detection element may comprise a transistor.

The detection element may be substantially surrounded by the driver element.

The driver element may comprise a p-channel MOSFET.

The detection element may comprise an n-channel MOSFET.

The driver element may comprise an n-channel MOSFET.

A plurality of detection elements may be provided.

According to a second aspect of the invention there is provided a device comprising an integrated circuit according to the first aspect.

According to a third aspect of the invention there is provided a method of reacting to an electrostatic discharge event occurring at a pin of a package of an integrated circuit, the method comprising detecting the occurrence of the electrostatic discharge event and causing activation of a system associated with the integrated circuit.

A voltage of a substrate on which a driver element of the integrated circuit is mounted may increase when an electrostatic discharge event occurs at the pin.

Detecting the occurrence of an electrostatic discharge event may comprise detecting the increased voltage of the substrate.

The driver element may be tolerant of electrostatic discharge events.

The system associated with the integrated circuit may comprise an electrostatic discharge protection system.

The electrostatic discharge protection system may comprise a transistor which is configured to connect a power supply rail of the integrated circuit to ground for a predetermined time period in the event of an electrostatic discharge event occurring at the pin.

The electrostatic discharge protection system may further comprise a capacitor for setting the predetermined period of time.

The detection element may be configured to discharge the capacitor in the event of an electrostatic discharge event occurring at the pin.

The electrostatic discharge protection system may comprise a transistor which is configured to disconnect part of the integrated circuit from a power supply rail of the integrated circuit in the event of an electrostatic discharge event occurring at the pin.

The electrostatic discharge protection system may further comprise a resistive element for limiting current to the electrostatic discharge protection system.

Alternatively, the system associated with the integrated circuit may comprise a correction system for a circuit.

The correction system may comprise a processor which is part of a digital circuit, the processor being configured to take corrective action when an electrostatic discharge event is detected.

The correction system may comprise a software program running on the processor, the software program being configured to cause the processor to take corrective action when an electrostatic discharge event is detected.

Alternatively, the correction system may comprise a digital circuit which is configured to take corrective action when an electrostatic discharge event is detected.

The correction system may comprise a reset mechanism for resetting the circuit to a known correct state of operation.

The occurrence of an electrostatic discharge event may be detected by a detection transistor.

The detection element may be substantially surrounded by the driver element.

The driver element may comprise a p-channel MOSFET.

The detection element may comprise an n-channel MOSFET.

The driver element may comprise an n-channel MOSFET.

A plurality of detection elements may be provided in the integrated circuit.

BRIEF DESCRIPTION OF THE DRAWINGS

Embodiments of the invention will now be described, strictly by way of example only, with reference to the accompanying drawings, of which.

DETAILED DESCRIPTION OF THE PREFERRED EMBODIMENTS

Figure 2:
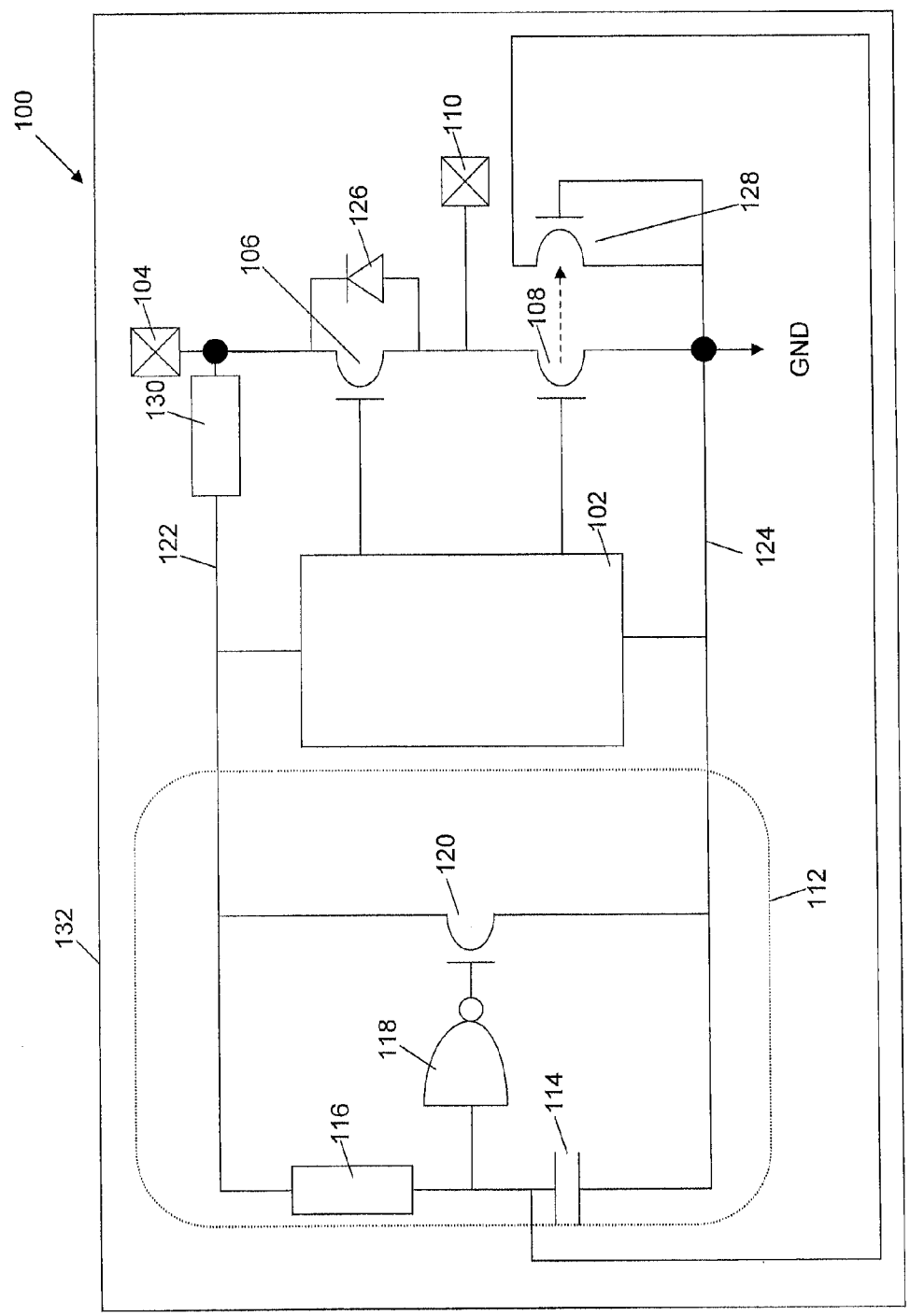
FIG. 2 is a schematic representation showing an integrated circuit according to the present invention having an electrostatic discharge protection system.

Referring to FIG. 2, an integrated circuit including an electrostatic discharge protection system is shown generally at 100, and comprises a core 102 which handles the core functionality of the integrated circuit 100. The integrated circuit 100 receives power via a power supply pad 104 which is electrically connected to a power supply pin of a package housing the integrated circuit 100. ESD tolerant output drivers 106, 108, which in this example comprise an n-channel and a p-channel MOSFET respectively, provide an output of the integrated circuit 100, which is accessed via an input/output pad 110 which is electrically connected to an output pin of the package housing the integrated circuit 100.

The integrated circuit further comprises an ESD protection system 112, which includes a network of a capacitor 114 and a resistor 116 which together provide a time-delayed signal at an input of an inverter 118, whose output is connected to the gate of a FET 120. The drain and source terminals of the FET 120 are connected respectively to a positive power supply rail 122 and a ground rail 124 of the integrated circuit 100.

A detection element is provided in the form of an n-channel MOSFET transistor 128 which is provided in close proximity to the output n-channel MOSFET driver 108. This detection transistor 128 is small, typically of the order of 1 μm to 100 μm wide and with a short gate length, and its source and gate terminals are connected to the ground rail 124, whilst its drain terminal is connected to an upper terminal (i.e. the terminal that is connected to the resistor 116) of the capacitor 114.

Figure 1:
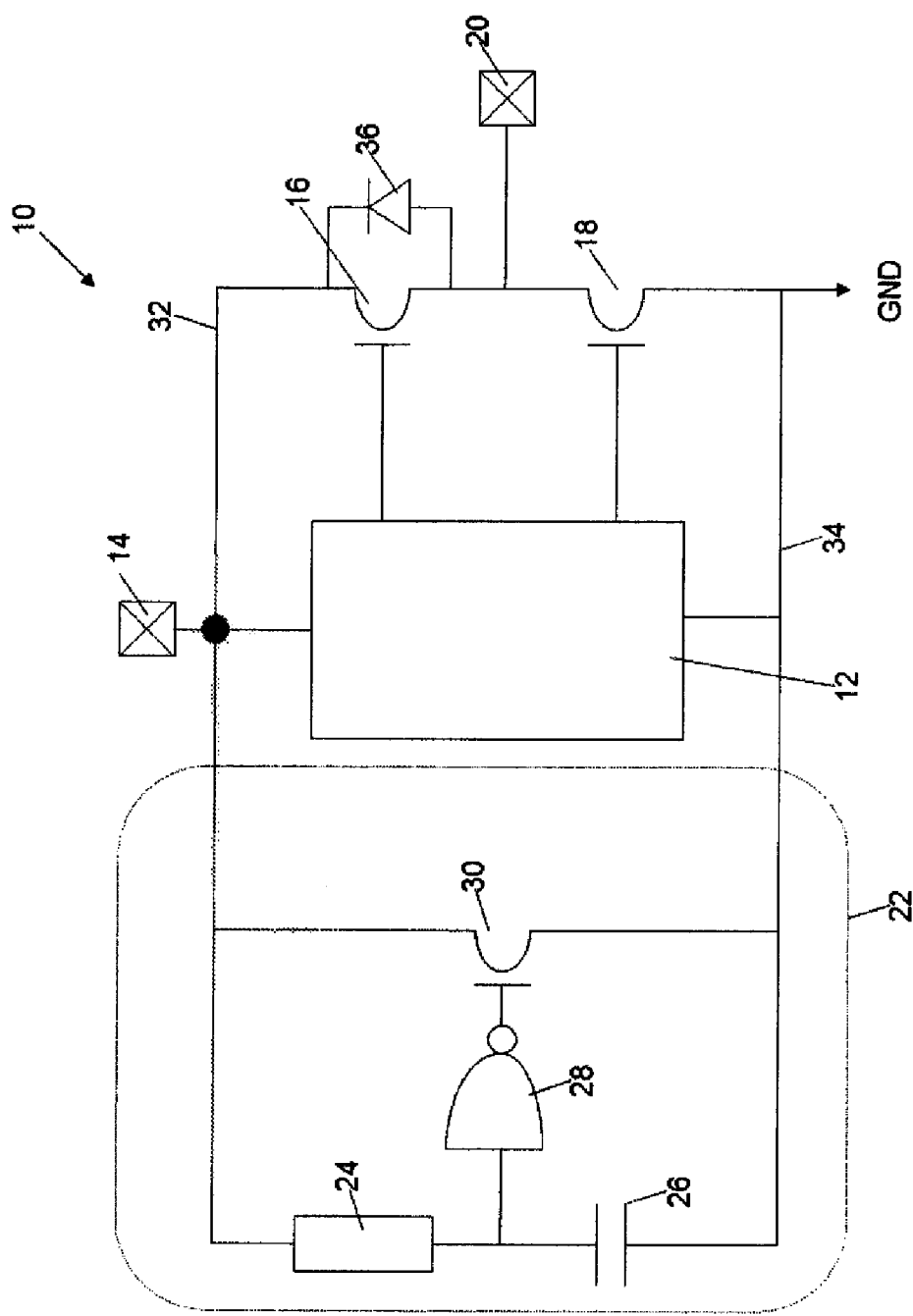
FIG. 1 is a schematic representation showing a prior art integrated circuit which includes an electrostatic discharge protection system.

In the event of an ESD event occurring at the pin to which the input/output pad 110 is connected, the n-channel MOSFET output driver transistor 108 conducts the ESD current to ground. Any current that flows into the positive power supply rail 122 through a parasitic diode 126 in the p-channel MOSFET output driver 106 is conducted to ground by the ESD protection system 112, which operates in the same manner as the ESD protection system 22 shown in FIG. 1 when the integrated circuit 100 is not powered. The ESD pulse is conducted to the positive power supply rail 122 by the parasitic diode 126 in the p-channel MOSFET output driver 106 through the resistor 130, and rapidly increases the voltage of the positive power supply rail 122. The input of the inverter 120 is temporarily held at 0 volts by the capacitor 114 and thus its output is high, causing the FET 120 to switch on, temporarily short circuiting the positive and ground rails 122, 124 of the integrated circuit to permit current from the ESD event to flow to ground, bypassing the core 102. Once the voltage across the capacitor 114 has reached a level at which the output of the inverter 118 goes low, the FET 120 switches off, permitting normal operation of the integrated circuit 100. The values of the capacitor 114 and the resistor 116 are chosen so as to permit sufficient time for all of the current associated with the ESD event to be conducted safely to ground before the FET 120 switches off.

If the integrated circuit 100 is powered, the capacitor 114 in the ESD protection system 112 is charged up to the voltage of the positive power supply rail 122 through the resistor 116. Thus the input of the inverter 118 is high and its output is low, resulting in the FET 120 being switched off. If an ESD event occurs at the pad 110 and sharply increases the voltage of the positive supply rail voltage as described above, the ESD protection system 112 will not trigger immediately in the same way as if the integrated circuit 100 is unpowered, as the capacitor 114 is already charged to the power supply voltage. If the voltage of the positive power supply rail 122 increases to a high enough level the ESD protection system 112 will eventually trigger, but at this point the voltage of the positive power supply rail 122 is so high that it is likely to damage the core 102 of the integrated circuit 100. Thus, it will be appreciated that when the integrated circuit 100 is powered, the fact that the capacitor 114 is charged before the ESD event occurs significantly reduces the performance of the ESD protection system 112.

The n-channel MOSFET output driver 108 works in conjunction with the detection transistor 128 to solve this problem.

During an ESD event at the input/output pad 110, the n-channel MOSFET output driver 108 undergoes a phenomenon known as "snapback". Snapback is a conduction mechanism which causes the potential of a substrate on which an n-channel MOSFET is mounted to increase. This increase in the potential of the substrate causes a parasitic bipolar transistor associated with the n-channel MOSFET to switch on. The drain of the n-channel MOSFET is the collector of the parasitic bipolar transistor, the source of the n-channel MOSFET is the emitter of the parasitic bipolar transistor and the bulk of the n-channel MOSFET is the base of the parasitic bipolar transistor.

In the circuit illustrated in FIG. 2 this snapback mechanism, which occurs in the n-channel output MOSFET output driver 108 when an ESD event occurs at the input/output pad 110, can conduct high ESD currents to the ground rail 124, but it is unable to clamp the voltage at the input/output pad 110 at a low enough level to prevent current from flowing into the positive power supply rail 122 and damaging circuits connected to the power supply rail 122, such as the core 102 of the integrated circuit 100. The ESD protection system 112 associated with the positive power supply rail 122 does not provide protection when the circuit is powered for the reasons described above.

The increase in substrate voltage which occurs during snapback can also cause the detection transistor 128, which in this example is an n-channel MOSFET, to conduct by increasing its substrate voltage and turning on the parasitic bipolar transistor associated with the detection transistor 128. It is important that the detection transistor 128 is in close proximity to the n-channel MOSFET output driver 108 to ensure that the detection transistor 128 will be switched on during snapback caused by an ESD event. In the circuit illustrated in FIG. 2, the drain of the detection transistor 128 is connected to an upper terminal of the capacitor 114 in the ESD protection system 112 (i.e. the terminal which is connected to the resistor 116), and when the detection transistor 128 is turned on by the increased substrate voltage of the n-channel MOSFET output driver 108 it causes the capacitor 114 to be connected to ground, thereby permitting the capacitor 114 to discharge. As the voltage across the capacitor 114 is now at or close to 0 volts the input of the inverter 118 is low and its output thus goes high, turning on the FET 120. Thus the positive power supply rail 122 is connected to the ground rail 124, ensuring that any current associated with the ESD event is safely conducted to ground, and thus away from the core 102.

As the detection transistor 128 is switched on every time an ESD event occurs at a pin connected to the input/output pad 110, the ESD protection system 112 can be triggered repeatedly even when the integrated circuit 100 is powered.

In some circumstances the detection transistor 128 may remain in a conductive state for the duration of the ESD event and will thus ensure that the capacitor 114 in the ESD protection system 112 will remain discharged for the duration of the ESD event. Once the ESD event has subsided to a sufficiently low current the detection transistor 128 will turn off and the capacitor 114 will be charged up to the voltage of the positive power supply rail voltage 122, causing the FET 120 to be turned off.

To improve the effectiveness of the detection transistor 128, it is advantageous to ensure that the detection transistor 128 is embedded in or physically surrounded by one or more output drivers 108. A plurality of detection transistors 128 may be provided to increase the probability that an ESD event will be detected and that the ESD protection system 112 will be enabled, with each of the plurality of detection transistors 128 being positioned in close proximity to an output driver 108.

The conductivity of the detection transistor 128 during an ESD event can be improved by connecting its gate to the ground rail 124 through a resistor, which improves the performance of the detection transistor 128 in detecting ESD events.

To protect the ESD protection system 112 from high currents associated with ESD events, a resistor 130 may be provided in the positive power supply rail 122. This limits the current which flows through the FET 120 during the ESD event but permits sufficient current to flow into the core 102 during normal operation of the integrated circuit 100. A suitable value for the resistor 130 may be around 10 ohms, although the exact value of the resistor can be calculated or estimated based on the drain voltage of the n-channel MOSFET output driver 108 when it is in snapback mode and conducting the maximum ESD current to ground, the maximum current that the FET 120 can conduct to ground during an ESD event and the voltage tolerance of the circuit (e.g. the core 102) to be protected.

As is mentioned above, the integrated circuit 100 is formed on a substrate 132, and this substrate 132 may be provided with a guard ring of p+ material, as is known in the art. To improve the effectiveness of the detection transistor(s) 128 in detecting the occurrence of an ESD event, p+ guard material is omitted in the space between the detection transistor(s) 128 and the n channel MOSFET output driver(s) 108.

It will be appreciated that the integrated circuit 100 described above may be modified in accordance with specific requirements and circumstances. For example, in the event that the integrated circuit 100 is powered by a negative supply voltage, a p channel MOSFET detection transistor could provided in close proximity to the p channel MOSFET output driver 106 to detect ESD events and enable the ESD protection system 112.

The principle of detecting and responding to an ESD event described above can be employed in alternative systems for protecting vulnerable parts of an integrated circuit from an ESD event. One such alternative system is illustrated in FIG. 3.

Figure 3:
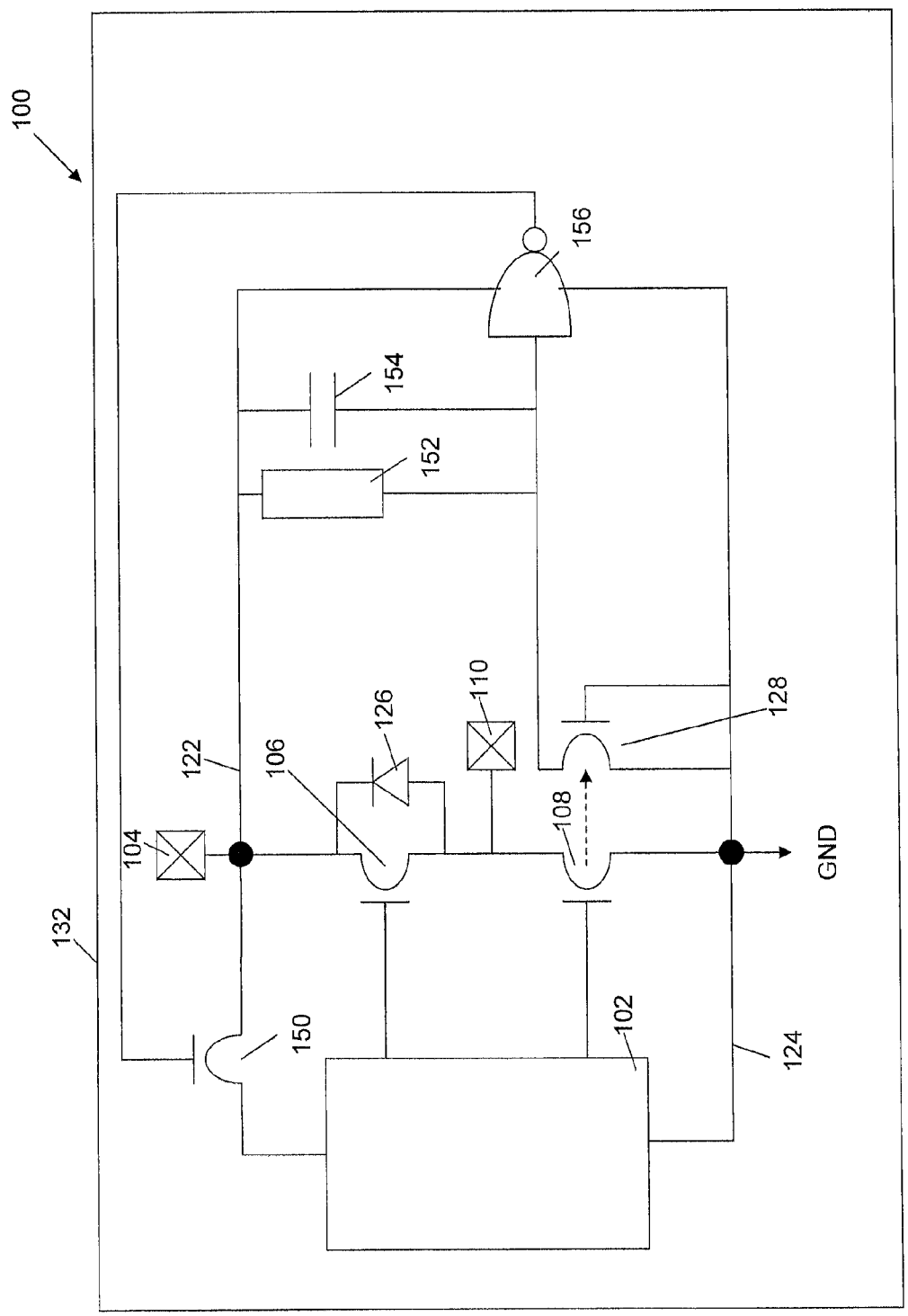
FIG. 3 is a schematic representation showing an integrated circuit according to the present invention having an alternative electrostatic discharge protection system.

The embodiment shown in FIG. 3 shares many features with the embodiment of FIG. 2, and thus common features share the same reference numerals in FIGS. 2 and 3. Although not shown in FIG. 3 for reasons of clarity, in this embodiment an ESD protection system is provided and is implemented in the same way as the ESD protection system 22 described above with reference to FIG. 1. In this embodiment a transistor 150 is provided in the positive power supply rail 122 to selectively permit current to flow to the core 102 of the integrated circuit 100. In this example the transistor 150 is a p-channel FET, but it will be appreciated that a bipolar device could equally be used. The gate of the transistor 150 is connected to the output of a NOT gate 156 whose input is connected to the drain of the detection transistor 128. A resistor 152 and a capacitor 154 are connected in parallel between the positive power supply rail 122 and the drain of the transistor 128 and operate in conjunction with the NOT gate 156 to maintain the gate of the transistor 150 at or near the ground voltage (i.e. 0 volts) during normal operation of the integrated circuit 100.

During normal powered operation of the integrated circuit 100, the detection transistor 128 is switched off, and the voltage at the drain of the detection transistor is thus at or close to the voltage of the positive power supply rail 122, due to the connection with the parallel resistor 152 and capacitor 154. The input to the NOT gate 156 is thus high, meaning that its output is low and the transistor 150 is switched on, as its gate is maintained at or near to the ground voltage by the output of the NOT gate 156. Thus, current is able to flow into the core 102 of the integrated circuit 100. In the event of an ESD event occurring at the input/output pad 110, the detection transistor 128 switches on, causing the voltage at the drain of the transistor 128 to drop to 0 volts. This signal is inverted by the NOT gate 156, whose output is used to turn the transistor 150 off, and thus current from the ESD event cannot flow into the vulnerable core 102 of the integrated circuit 100. Once the ESD event has finished the capacitor 154 takes a short time to charge up, during which time the transistor 150 remains switched off. This ensures that any residual current remaining after the ESD event has finished can be safely conducted to ground before the connection to the sensitive core 102 of the integrated circuit 100 is re-established, thereby ensuring that the core 102 cannot be damaged by such residual currents after the ESD event has finished.

It will be appreciated by those skilled in the art that an ESD event can cause disruption to or corruption of circuits affected by the ESD event, or circuits associated with those which are affected by the ESD event. The ESD detection system described above can be employed to cause circuits which may have been corrupted by an ESD event to be reset into a known correct state of operation, or to notify circuits which may have been corrupted by the ESD event that corrective action should be taken to correct any corruption which may have occurred.

Figure 4:
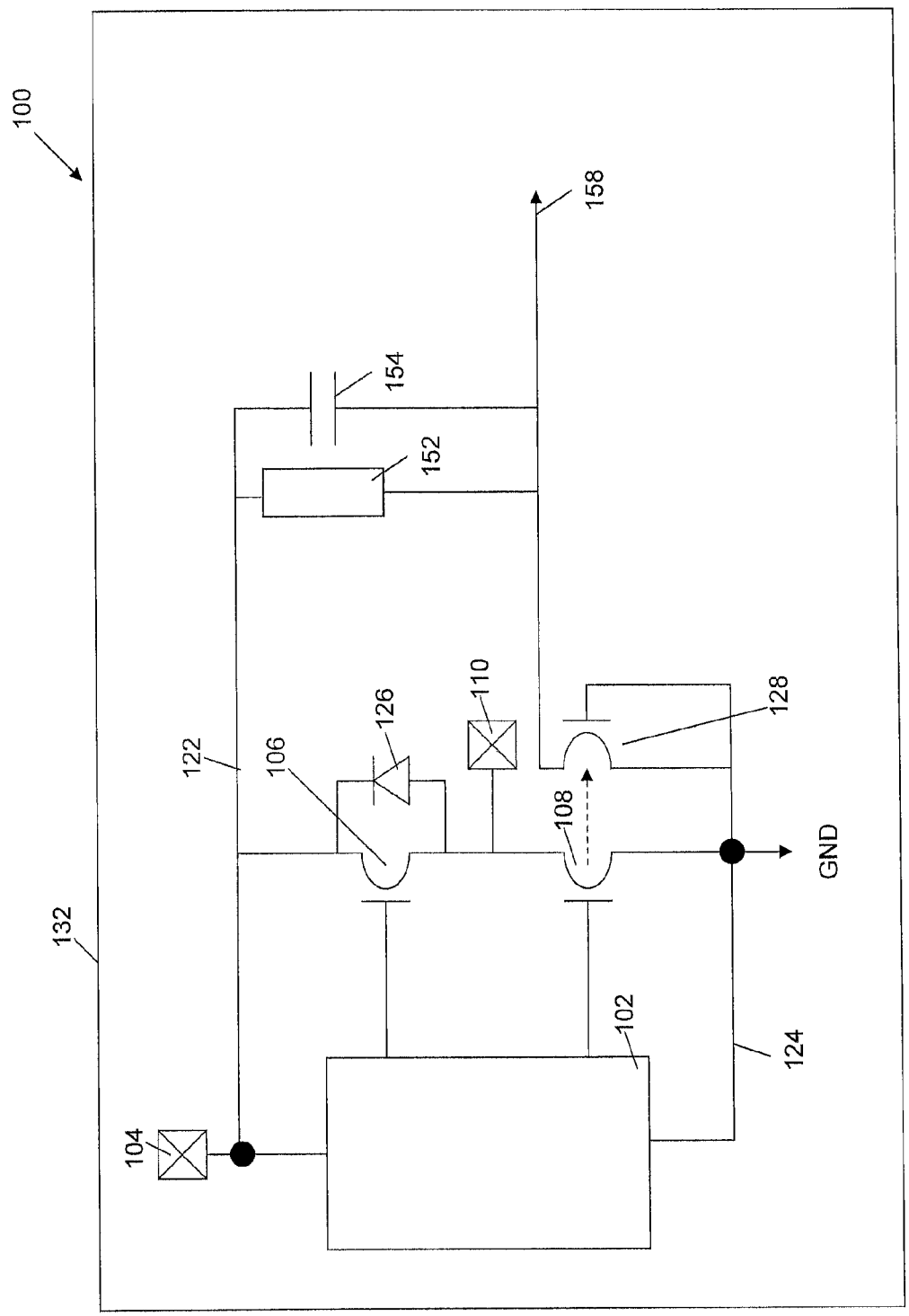
FIG. 4 is a schematic representation showing an integrated circuit according to the present invention in which a detection element can be used to trigger an external system.

FIG. 4 shows an exemplary system for signalling that an ESD event has occurred so that any circuit which may have been corrupted or disrupted by the ESD event can be reset or otherwise corrected. The embodiment shown in FIG. 4 shares many features with the embodiments of FIGS. 2 and 3, and thus the same reference numerals have been used in FIG. 4 for common elements. In the exemplary system shown in FIG. 4 the transistor 150 of FIG. 3 has been removed, such that the positive power supply rail 122 is unbroken. A connection 158 provides a signal in the event of an ESD occurrence, which signal can be detected by circuits that may be affected by the ESD event. Affected circuits may then take corrective action, by resetting to a known correct state of operation or by taking other corrective action to repair or undo any corruption that may have occurred as a result of the ESD event. Such circuits may form part of the integrated circuit 100, and may for example form part of the core 102 of the integrated circuit 100. Alternatively, such circuits may be external to the integrated circuit 100.

As an example, a digital circuit may be connected to the integrated circuit 100, and the operation of this digital circuit may be affected by an ESD event. The digital circuit may include a processor which is connected to the connection 158, and which is configured to cause the digital circuit to reset to a known correct state of operation or to take other corrective action in the event that a signal is received by the processor from the connection 158 indicating that an ESD event has occurred. The processor of the digital circuit may be programmed with software or firmware which detects the signal from the connection 158 and causes the digital circuit to take corrective action. Alternatively, in a digital circuit where no processor is provided a connection may be provided which, on detection of a logic zero signal at the connection 158, indicating that an ESD event has occurred, causes the digital circuit to reset to a know correct state of operation, or to take other corrective action.

The embodiment of FIG. 4 functions in a similar manner to that of FIG. 3. Thus, in normal operation of the integrated circuit 100 the connection 158 is held at or near to the voltage of the positive supply rail 122 by the resistor 152 and the capacitor 154. In the event of an ESD event, the detection transistor 128 switches on, causing the voltage at the connection 158 to drop to 0 volts or almost 0 volts. This change in the voltage of the connection 158 can be detected by circuits which may be adversely affected by the ESD event and can trigger corrective action for such circuits. Once the ESD event has finished, the capacitor 154 takes a short time to charge up to the voltage of the positive power supply rail 122, and the connection 158 remains at or close to 0 volts for that time. This ensures that there is sufficient time for any circuits monitoring the connection 158 to detect the occurrence of the ESD event and to take appropriate corrective action.

The integrated circuit 100 may be used in a device such as a Bluetooth® headset or the like. By using the integrated circuit 100 in such a device, additional ESD protection components can be omitted, thereby reducing the cost, weight and physical size of the device.

The invention claimed is:

1. An integrated circuit comprising a driver element electrically connected to a pin of a package housing the integrated circuit, the driver element being associated with a detection element such that on detection of an electrostatic discharge event occurring at the pin by the detection element a system associated with the integrated circuit can be activated, wherein a voltage of a substrate on which the driver element is mounted increases when an electrostatic discharge event occurs at the pin, and wherein the detection element is located in close proximity to the driver element such that when an electrostatic discharge event occurs at the pin the detection element is activated by the increased voltage of the substrate.

2. An integrated circuit according to claim 1 wherein the driver element is tolerant of electrostatic discharge events.

3. An integrated circuit according claim 1 wherein the system associated with the integrated circuit comprises an electrostatic discharge protection system.

4. An integrated circuit according to claim 3 wherein the electrostatic discharge protection system comprises a transistor which is configured to connect a power supply rail of the integrated circuit to ground for a predetermined time period in the event of an electrostatic discharge event occurring at the pin.

5. An integrated circuit according to claim 4 wherein the electrostatic discharge protection system further comprises a capacitor for setting the predetermined period of time.

6. An integrated circuit according to claim 5 wherein the detection element is configured to discharge the capacitor in the event of an electrostatic discharge event occurring at the pin.

7. An integrated circuit according to claim 3 wherein the electrostatic discharge protection system comprises a transistor which is configured to disconnect part of the integrated circuit from a power supply rail of the integrated circuit in the event of an electrostatic discharge event occurring at the pin.

8. An integrated circuit according to claim 3 further comprising a resistive element for limiting current to the electrostatic discharge protection system.

9. An integrated circuit according to claim 1 wherein the system associated with the integrated circuit comprises a correction system for a circuit.

10. An integrated circuit according to claim 9 wherein the correction system comprises a processor which is part of a digital circuit, the processor being configured to take corrective action when an electrostatic discharge event is detected by the detection element of the integrated circuit.

11. An integrated circuit according to claim 10 wherein the correction system comprises a software program running on the processor, the software program being configured to cause the processor to take corrective action when an electrostatic discharge event is detected by the detection element of the integrated circuit.

12. An integrated circuit according to claim 9 wherein the correction system comprises a digital circuit which is configured to take corrective action when an electrostatic discharge event is detected by the detection element of the integrated circuit.

13. An integrated circuit according to claim 9 wherein the correction system comprises a reset mechanism for resetting the circuit to a known correct state of operation.

14. An integrated circuit according to claim 1 wherein the detection element comprises a transistor.

15. An integrated circuit according to claim 1 wherein the driver element comprises a p-channel MOSFET.

16. An integrated circuit according to claim 1 wherein the detection element comprises an n-channel MOSFET.

17. An integrated circuit according to claim 1 wherein the driver element comprises an n-channel MOSFET.

18. An integrated circuit according claim 1 wherein a plurality of detection elements are provided.

19. A device comprising an integrated circuit according to claim 1.

20. An integrated circuit comprising a driver element electrically connected to a pin of a package housing the integrated circuit, the driver element being associated with a detection element such that on detection of an electrostatic discharge event occurring at the pin by the detection element a system associated with the integrated circuit can be activated, wherein the detection element is substantially surrounded by the driver element.

21. A method of reacting to an electrostatic discharge event occurring at a pin of a package of an integrated circuit, the method comprising detecting, at a detection element, the occurrence of the electrostatic discharge event and causing activation of a system associated with the integrated circuit, wherein a voltage of a substrate on which a driver element of the integrated circuit is mounted increases when an electrostatic discharge event occurs at the pin, and wherein the detection element is substantially surrounded by the driver element.

22. A method according to claim 21 wherein the driver element comprises a p-channel MOSFET.

23. A method according to claim 21 wherein the detection element comprises an n-channel MOSFET.

24. A method according to claim 21 wherein the driver element comprises an n-channel MOSFET.

25. A method according to claim 21 wherein a plurality of detection elements are provided in the integrated circuit.

26. A method according to claim 21 wherein detecting the occurrence of an electrostatic discharge event comprises detecting the increased voltage of the substrate.

27. A method according to claim 21 wherein the driver element is tolerant of electrostatic discharge events.

28. A method according to claim 21 wherein the system associated with the integrated circuit comprises an electrostatic discharge protection system.

29. A method according to claim 28 wherein the electrostatic discharge protection system comprises a transistor which is configured to connect a power supply rail of the integrated circuit to ground for a predetermined time period in the event of an electrostatic discharge event occurring at the pin.

30. A method according to claim 29 wherein the electrostatic discharge protection system further comprises a capacitor for setting the predetermined period of time.

31. A method according to claim 30 wherein the detection element is configured to discharge the capacitor in the event of an electrostatic discharge event occurring at the pin.

32. A method according to claim 28 wherein the electrostatic discharge protection system comprises a transistor which is configured to disconnect part of the integrated circuit from a power supply rail of the integrated circuit in the event of an electrostatic discharge event occurring at the pin.

33. A method according to claim 32 wherein the electrostatic discharge protection system further comprises a resistive element for limiting current to the electrostatic discharge protection system.

34. A method according to claim 21 wherein the system associated with the integrated circuit comprises a correction system for a circuit.

35. A method according to claim 34 wherein the correction system comprises a processor which is part of a digital circuit, the processor being configured to take corrective action when an electrostatic discharge event is detected.

36. A method according to claim 35 wherein the correction system comprises a software program running on the processor, the software program being configured to cause the processor to take corrective action when an electrostatic discharge event is detected.

37. An integrated circuit according to claim 34 wherein the correction system comprises a digital circuit which is configured to take corrective action when an electrostatic discharge event is detected.

38. A method according to claim 34 wherein the correction system comprises a reset mechanism for resetting the circuit to a known correct state of operation.

39. A method according to claim 21 wherein the occurrence of an electrostatic discharge event is detected by a detection transistor.

* * * * *

UNITED STATES PATENT AND TRADEMARK OFFICE
CERTIFICATE OF CORRECTION

| | |
|---|---|
| PATENT NO. | : 8,411,398 B2 |
| APPLICATION NO. | : 12/609916 |
| DATED | : April 2, 2013 |
| INVENTOR(S) | : Pugsley |

It is certified that error appears in the above-identified patent and that said Letters Patent is hereby corrected as shown below:

In the Specification

In Column 5, Lines 61-62, delete "inverter 120" and insert -- inverter 118 --, therefor.

Signed and Sealed this
Fourth Day of June, 2013

Teresa Stanek Rea
*Acting Director of the United States Patent and Trademark Office*